United States Patent [19]

Haemer et al.

[11] 4,298,646
[45] Nov. 3, 1981

[54] DIFFERENTIAL GLOSS PRODUCTS AND METHODS OF MAKING THE SAME

[75] Inventors: Laurence F. Haemer, Newtown, Pa.; Theodore Kimak, Clifton, N.J.

[73] Assignee: Congoleum Corporation, Kearny, N.J.

[21] Appl. No.: 164,456

[22] Filed: Jun. 30, 1980

[51] Int. Cl.³ .......................... B32B 3/30; B05D 3/02
[52] U.S. Cl. .................................... 428/159; 427/180; 427/270; 427/373; 428/206; 428/208; 428/424.6; 428/425.9
[58] Field of Search ............... 428/158, 159, 160, 206, 428/207, 208, 424.6, 425.9; 427/180, 264, 270, 373

[56] References Cited

U.S. PATENT DOCUMENTS

| | | | |
|---|---|---|---|
| 3,293,094 | 12/1966 | Nairn et al. | 428/158 |
| 3,293,108 | 12/1966 | Nairn et al. | 428/159 |
| 3,660,187 | 5/1972 | Shortway | 156/79 |
| 4,172,169 | 10/1979 | Mawson et al. | 428/159 |
| 4,187,131 | 2/1980 | Shortway | 428/159 |
| 4,210,693 | 7/1980 | Regan et al. | 428/315 |

*Primary Examiner*—William J. Van Balen

[57] ABSTRACT

A method of making a differential gloss product which comprises: forming a gelled, potentially foamable, base resinous material; printing thereon a predetermined pattern, some portions containing a urethane polymerization catalyst and either the same or other portions containing a foaming inhibitor; applying to the printed pattern a resinous wear layer; gelling the resinous wear layer and foaming and fusing the resinous materials; applying a urethane coating composition containing no urethane polymerization catalyst to the resinous wear layer; heating to polymerize the portions of the urethane coating composition lying directly over the portions containing the urethane polymerization catalyst to create interspersed high gloss polymerized surfaces; dusting onto the entire surface of the urethane coating composition a powdered particulate or granular material containing a urethane polymerization catalyst; removing the excess particulate or granular materials from the interspersed, polymerized, high gloss areas; and heating to polymerize the remaining surfaces of the urethane coating composition to create thereat low gloss surfaces due to the presence of the occluded particulate or granular materials therein.

16 Claims, 2 Drawing Figures

DIFFERENTIAL GLOSS PRODUCTS AND METHODS OF MAKING THE SAME

THE FIELD OF THE INVENTION

The present invention relates to decorative sheet materials, and more particularly to multi-layered, resinous, decorative sheet materials having surface portions having differential gloss effects, and to methods of making such differential gloss, decorative sheet materials. Even more particularly, the present invention relates to differential gloss, decorative sheet materials having raised, emossed or textures surface areas in substantially perfect registry with the surface areas having the surface differential gloss effects. Such decorative sheet materials having differential gloss effects are of use as: floor, wall or ceiling coverings; desk, table or counter tops; and a host of other commercial, industrial and household applications.

THE GENERAL BACKGROUND OF THE INVENTION

Decorative sheet materials of a resinous polymer composition have been made for many years and one of the commonest ways of creating or enhancing the surface decorative effects has been to provide selected portions of the surface of such decorative sheet materials with different types of contrasting finishes or effects, or surface gloss or luster differentials, for example, with smooth, glossy or lustrous surfaces; raised, embossed dead or dull mat surfaces; raised, embossed glossy or lustrous surfaces; smooth, dead or dull mat surfaces; etc., all sharply contrasting with one another to create differential gloss products.

Many methods, including differential mechanical embossing, inlaying, or chemical embossing or etching, and many other methods, have been devised to provide sharply contrasting surface areas but all of such prior art methods or combinations thereof have always left something to be desired. For example, differential mechanical embossing procedures combined with pattern or design printing procedures has always created registration problems and related difficulties. Inlaying procedures and chemical etching methods have normally been more costly and more process-time consuming.

PURPOSES AND OBJECTS OF THE INVENTION

It is therefor a principal purpose and object of the present invention to provide resinous polymer compositions in sheet material form having selective, surface decorative effects created by the controlled placement of various different surface finishes, raised embossings, or surface gloss differentials, wherein smooth or embossed, glossy or lustrous surface areas sharply contrast with each other and with smooth or raised embossed dead or dull mat finish surfaces, using methods in which registration errors, problems and difficulties are substantially completely eliminated and which methods are neither costly nor process-time consuming.

BRIEF SUMMARY OF THE INVENTION

It has been found that such principal purposes and objects, and other principal purposes and objects which will become clear from a further reading and understanding of this disclosure, may be accomplished by providing a method of making a differential gloss product which comprises: forming a potentially foamable base resinous plastisol on a supporting structure, such as a fibrous backing sheet; heating and gelling the potentially foamable base resinous plastisol; applying to the surface of the gelled plastisol a printing ink composition in a predetermined pattern or design, some portions of which contain a urethane polymerization catalyst and either the same or other portions of which contain a blowing or foaming inhibitor; applying to the surface of the printed, gelled base resinous plastisol a resinous plastisol wear layer; heating and gelling the resinous plastisol wear layer and blowing or foaming the potentially foamable base resinous plastisol at elevated temperatures and fusing the base resinous plastisol and the resinous wear layer; applying to the surface of the fused resinous wear layer a urethane coating composition containing no urethane polymerization catalyst; applying heat to polymerize the urethane coating composition in those surface portions lying directly over the printing ink portions containing urethane polymerization catalysts, whereby such polymerized surface portions of the urethane coating composition are given a relatively high gloss and a relatively hard surface, whereas the unpolymerized surface portions of the urethane coating composition remain tacky and fluid or semi-fluid; applying to the entire surface of the interspersedly polymerized urethane coating composition a powdered or granulated particulate material containing a urethane polymerization catalyst; removing the powdered or granulated particulate material from those hardened, high gloss surface portions of the urethane coating composition which had been polymerized; and applying heat to polymerize those tacky, fluid or semi-fluid surface portions of the urethane coating composition which had not been previously polymerized but which now are polymerized but now are given a relatively lower or reduced gloss surface due to the presence of the occluded powdered or granulated particulate material therein.

BRIEF DESCRIPTION OF THE DRAWINGS

In the following specification and accompanying self-explanatory drawings, there are described and illustrated preferred and typical embodiments of the present invention but it is to be appreciated that the present invention is not to be construed as limited to such preferred and typical embodiments as are specifically disclosed and illustrated therein but to include other similar and equivalent embodiments, as are determined by the scope and the spirit of the appended claims.

Referring to the accompanying self-explanatory drawings,

Figure 1:
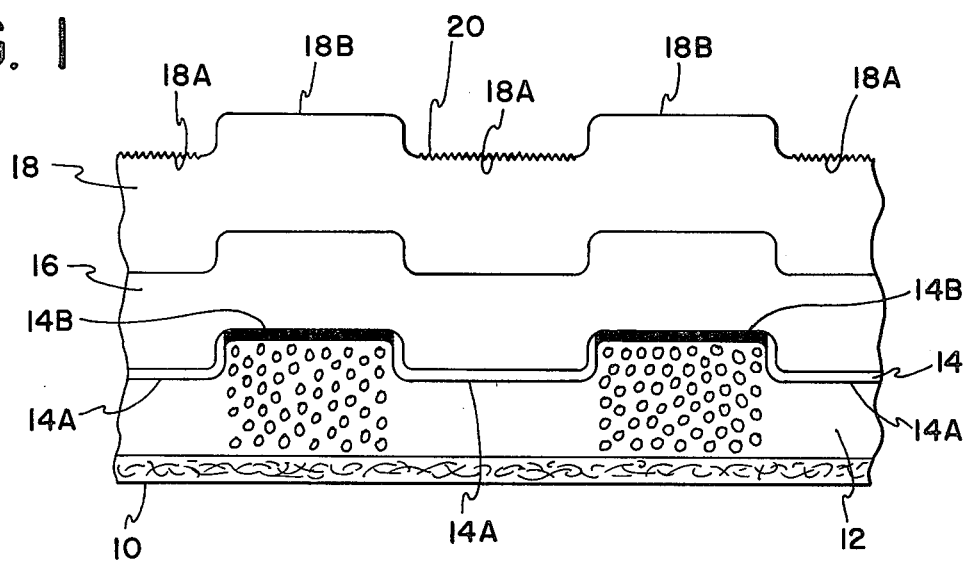
Figure 2:
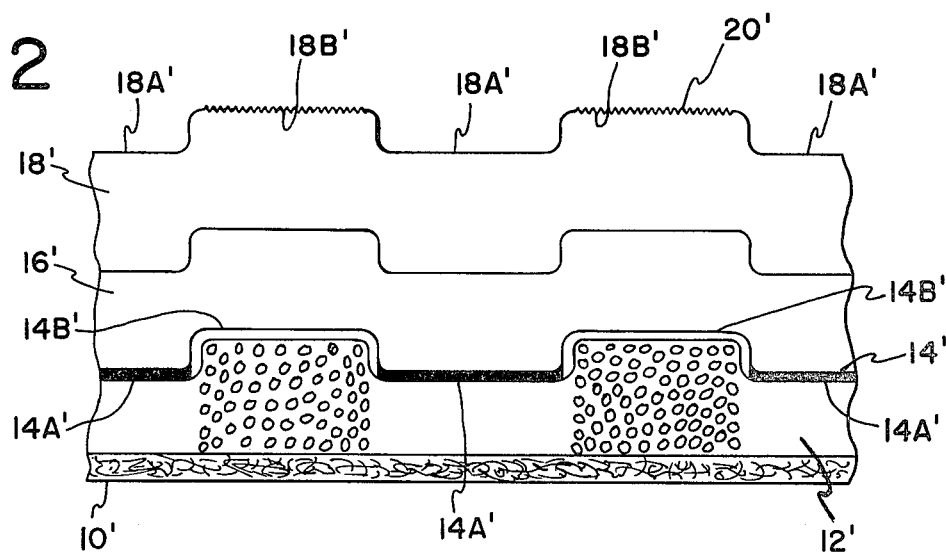

FIG. I is a fragmentary, diagrammatic, elevational, cross-sectional view of one embodiment of the present invention, subsequent to the heating and fusing of the resinous materials, plus blowing or foaming if a blowing or foaming agent was originally included in the base resinous plastisol material composition and if a blowing or foaming inhibitor was originally included in some portions of the printing ink composition; and FIG. II is a fragmentary, diagrammatic, elevational, cross-sectional view of another embodiment of the present invention under process conditions similar to those of FIG. I. As will be described in greater detail hereinafter, FIG. II may represent a different product than that illustrated in FIG. I or it may represent a different portion of the product illustrated in FIG. I.

These Figures have not been drawn precisely or accurately to scale. Some portions and some dimensions have been drawn to a slightly larger scale, whereas certain other portions and other dimensions therein have been drawn to a slightly smaller scale. This has been done merely to bring out more clearly some of the details of the smaller portions and elements and to accentuate some of the more important features and aspects of the present invention, such as the thickness of the printing ink composition layer which has been increased manyfold in the Figures for a clearer understanding of its various portions.

GENERAL DESCRIPTION OF THE INVENTION

The present invention will be generally described and illustrated primarily with reference to FIG. I which is a preferred and typical embodiment of the invention but which is not to be construed as limitative of the broader aspects of the inventive concept. In FIG. I, there is illustrated a relatively flat, fibrous backing sheet material 10 upon which is deposited or formed a conventional, potentially foamable, base resinous plastisol composition 12, or, if desired or required, a conventional, non-foamable, base resinous plastisol composition which does not contain any blowing or foaming agent.

THE BACKING SHEET MATERIAL

A relatively flat, backing web or sheet material 10 may be used, if desired or required, as the base layer or supporting substrate for the base resinous polymer compositions of the present inventive concept. Such a backing sheet material 10 may comprise a felted or matted fibrous sheet of overlapping, intermingled fibers and/or filaments; or a nonwoven, knitted, woven, or otherwise fabricated textile construction; or a sheet of resinous polymer composition; or paper or a paper product; or similar or like materials and constructions. A felted fibrous sheet material comprising inorganic fibers, such as asbesto; or organic fibres, such as cellulose, cotton, jute or rayon; or synthetic or manmade fibers and/or filaments, such as polyolefins, polyamides, acrylics, polyesters, glass, etc., are the most commonly used backing sheet materials but others are equally suitable and are utilizable in special situations. Such backing sheet materials are well set forth in many prior art patents, such as U.S. Pat. Nos. 3,293,094, 3,293,108, 3,660,187 and 4,187,131.

The thickness of such a relatively flat, fibrous backing sheet matrial 10 will depend to a large extent upon the particular product to be made and the particular subsequent use for which it is intended. Normally, such a thickness is in the range of from about 10 mils to about 90 mils, but other thicknesses, especially those greater than 90 mils, may be used in particular and special circumstances.

THE BASE RESINOUS POLYMER COMPOSITION

The relatively flat, backing sheet material 10 may be omitted completely and the foamable or non-foamable resinous polymer composition 12 may be used by itself. Such resinous polymer composition 12 may be made by well-known standard and conventional methods and may contain one or more synthetic resins, such as a polymer or co-polymer of vinyl chloride, or other resins such as polyurethane, an elastomer such as natural or synthetic rubber, and the like, as the main constituent resin.

Other constituents of such resinous polymer compositions 12 include: a blowing or foaming agent, such as azodicarbonamide, if a blowing or foaming agent is desired or required; various accelerator/stabilizers or catalysts such as dibasic lead phthalate, zinc octoate, lead octoate, dibasic lead phosphite, etc.; various light and/or heat stabilizers, such as metallic soaps; one or more plasticizers such as dioctyl phthalate, butyl benzyl phthalate, dibutyl sebacate, etc.; coloring agents and pigments such as titanium dioxide; solvents and diluents such as methyl ethyl ketone, mineral spirits, etc.; fillers such as clay and limestone; and many other conventional and well-known additives and improvement agents.

Although a polymer or co-polymer of vinyl chloride in the form of a plastisol is the preferred and typical synthetic resin to be incorporated into the base resinous polymer composition, many other resins are of equal applicability, not only in plastisol form but also in organosol, latex or solvent form. The specific resin and its particular form of use as it is being utilized resin and its particular form of use as it is being utilized does not relate to the essence of the inventive concept and many other resins are set forth in the previously mentioned U.S. Patents.

If no backing sheet material, such as a felted or matted fibrous web, is to be used, then the base resinous composition may be doctored by a doctor blade, or roll coated, or poured, or cast, or otherwise applied or formed on a strippable supporting carrier which may be a steel belt, a rubber belt, release paper, or felt or other fabric or material having a release surface or coating thereon and subsequently stripped or removed therefrom.

However, if a backing sheet material 10 is to be used and is to remain as part of the final product, then the base resinous composition 12 may be doctored by a doctor blade, or roll coated, or poured, or cast, or otherwise applied or formed and adhered to the carrying sheet material, such as the fibrous backing sheet material 10, in a substantially uniform manner in a relatively uniform thin coating by procedures well-known in the art. The thickness of such a base resinous composition 12 as a foamable material, as applied and still wet, is in the range of from 5 mils to about 50 mils, or even more, if so desired or required by its subsequent use.

THE GELLING OF THE BASE RESINOUS COMPOSITION

After the base resinous plastisol composition 12 has been applied or formed on the carrying backing sheet material, it is then heated under moderately gentle heat for a period of time of from about ½ minute to about 4 minutes at an elevated temperature of from about B 240° F. to about 400° F., but more normally commercially from about 290° F. to about 350° F., whereby the plastisol gels and firms so that it can be more easily handled and processed in subsequent operations. The elevated temperature, however, is not that sufficiently high as to activate or to decompose the particular blowing or foaming agent which may be present as to cause blowing or foaming of the base resinous polymer composition.

THE PRINTING OF THE GELLED BASE RESINOUS COMPOSITION

The gelled, firm base resinous composition 12 is then cooled and is printed or coated with a suitable printing ink composition or compositions 14 in the desired or required pattern or design which may possess many colors. The particular pattern or design which is used does not relate to the essence of the invention and any suitable pattern or design may be selected. The printing procedure, in general, is conventional and should require no further description, inasmuch as such procedures are well known in the industry and are described in many publications and patents.

THE BLOWING OR FOAMING INHIBITORS

If it is desired that different levels or heights of the blowing or foaming effects be obtained, then, predetermined portions or parts 14A of the particular pattern or design printed on the surface of the base resinous polymer compositions 12 contain a blow modifier or inhibitor in different amounts, concentrations, or types, and so forth, depending upon the variety of differential blowing or foaming effects desired. Such differential blowing effects are well described in the previously mentioned U.S. Patents and should need no further explanation or description.

Such blowing or foaming inhibitors are normally included in the particular printing ink composition in amount of from about 1% to about 35% by weight, based on the total weight of the printing ink composition. Many typical blowing and foaming inhibitors are mentioned in the previously described United States Patents, among the more popular are:
  trimellitic anhydride
  fumaric acid
  benzotriazole Naturally, if no blowing or foaming effects or chemical embossing effects are desired as a result of subsequent heating procedures, then, no blow modifying agents or inhibitors are included in the printing ink composition 14 and the heights and levels and the extent of the blowing or foaming operation is substantially uniform. Some typical and well known conventional printing ink compositions are noted in the previously mentioned U.S. Patents.

THE URETHANE POLYMERIZATION CATALYSTS

Also, as shown in FIG. I, in predetermined parts or portions 14B of the predetermined pattern or design, which parts or portions 14B are shown in different places of the predetermined pattern or design in FIG. I, but which may be the same places and, as a matter of fact, there may even be places where is neither blowing or foaming inhibitor nor urethane polymerization catalyst, there is included a urethane polymerization catalyst in an amount of from about ¼% to about 20% by weight, based on the total weight of the printing ink composition in which it is included. Preferred and typical examples of such urethane polymerization catalysts are:
  dibutyl tin dilaurate
  dibutyl tin di-2-ethylhexanoate
  dibutyl tin diacetate
  dibutyl tin maleate
  dibutyl tin oxide
  tetramethyl tin
  dimethyl dioctyl tin
  stannous octoate
  lead octoate
  zinc octoate
  zinc 2-ethylhexanoate
  lead naphthenate
  copper naphthenate
  diethyl cyclohexylamine
  N-methyl morpholine
  N,N-dimethyl ethanolamine
  N-methyl diethanolamine In some instances, as required or desired by existing conditions and circumstances, a relatively small amount, say, from about ¼% to about 2% by weight, a low concentration, of the urethane polymerization catalyst may also be included in the portions or parts 14A, in order to modify, adjust, or control the relative degree of tackiness of the superjacent surfaces of the wear layer lying directly thereover, such as in the surface areas 18A.

THE RESINOUS WEAR LAYER

The printed, gelled potentially foamable base resinous polymer composition 12 is then allowed to dry and a resinous wear layer 16 in the form of a resinous polymer composition or plastisol is then applied thereto substantially uniformly. Such a wear layer 16 contains conventional and standard constituents, such as synthetic resins, preferred and typical being polymers or co-polymers of vinyl chloride, medium to low molecular weight, and plasticizers, stabilizers, pigments or dyes on rare occasions, solvents and diluents, viscosity improvement and controlling agents, and like additives and materials. The concentrations of such added constituents are conventional and standard and are in the ranges and concentrations set forth in the previously mentioned U.S. Patents.

The relatively flat, resinous wear layer 16 has an average thickness of from about 0.002 inch to about 0.025 inch and is applied substantially uniformly to the surface of the printed, gelled and firmed base resinous polymer composition 12. The wear layer 16, in normal practice, is usually a clear, unpigmented resinous polymer composition and its basic purpose in usually to give to the final product improved wearing properties and qualities.

THE GELLING OF THE RESINOUS WEAR LAYER

After the wear layer 16 has been applied to the printed, gelled base resinous composition 12, it may be desired to gel and firm its surface in a separate operation. If it is, then the wear layer is heated under moderately gentle heat in an oven or other heating device for a period of from about ½ minute to about 4 minutes at an elevated temperature of from about 240° F. to about 400° F., whereby it hardens or firms and gels so that it can be handled more easily in subsequent operations. Again, the elevated temperatures must not be that high as to activate or to decompose the blowing or foaming agent which is normally present in the base resinous composition 12, if blowing or foaming is desired in the final product but not desired at this particular time in the manufacturing process.

However, if it is desired that blowing and foaming, as well as fusion of the resinous materials, take place in the same procedure at elevated temperature along with the gelling of the wear layer, such may be easily accomplished by heating in an oven or other suitable heating device to an elevated temperature which is higher than the previously stated temperatures for gelling. Such more elevated temperatures are in the range of from about 325° F. to about 470° F. for a period of time of from about 1 minute to about 4 minutes. Such heating procedures are standard and conventional and are described in the previously cited U.S. Patents.

THE URETHANE TOP COATING COMPOSITION

A urethane top coating coating composition 18 is then applied or formed substantially uniformly on the blown or foamed and fused surface of the resinous wear layer 16 to a depth or thickness of from about 0.0005 inch to about 0.015 inch. The specific and particular urethane top coating composition 18 which is employed does not relate to the essence of the present invention and normally comprises a substantially uniform mixture of unreacted polyols or polyhydroxy compounds and unreacted polyisocyanates, as originally applied to the surface of the resinous wear layer 16, along with additives, such as surfactants, or other constituents, as desired or required. However, such a top coating urethane coating composition 18 does not contain any urethane polymerization catalysts or any urethane polymerization initiators. As a consequence, the polyols and the polyisocyanates do not react with each other to any substantial degree at the time of the application to the blow or foamed and fused resinous wear layer.

The polyols or polyhydroxy compounds may be selected from a very wide range of suitable diols, triols, tetrols, or various other polyols and polyhydroxy compounds, or mixtures thereof, from many various sources, including glycols, polyether glycols, polyester glycols, glycerols, trialkylol alkanes, alkane triols, polyether triols, polyester triols, erythritol, pentaerythritol, polyols having a functionality higher than four, caprolactone polyols, poly(hydroxyalkyl) derivatives of such compounds as the alkylene polyamines, the various polyether polyols with amines, etc. One example of the latter-most groups is N,N,N',N'-tetrakis (2-hydroxypropyl) ethylenediamine. Mixtures of polyols may be used.

The polyisocyanates may be selected from a large group of aliphatic, aromatic, cycloaliphatic, and heterocyclic polyisocyanates, such as methylene-bis(4-cyclohexylisocyanate), isophorone diisocyanate (3-isocyanatomethyl-3,5,5-trimethyl-cyclohexyl-isocyanate), 2,4,4-trimethyl-hexamethylene diisocyanate, etc. Mixtures of polyisocyanates may be used.

THE CURING OF THE URETHANE TOP COATING COMPOSITION

The blown or foamed and fused resinous material with the applied urethane top coating composition 18 thereon is then exposed to elevated temperatures of from about 250° F. to about 425° F. and preferably from about 270° F. to about 420° F. for a period of time of from about 2 minutes to about 10 minutes in an oven or other suitable heating means, whereupon the polymerization reaction between the polyols and the polyisocyanates in the urethane top coating composition 18 is initiated. However, such polymerization reaction is initiated only in those portions or parts 18B of the urethane top coating composition 18 which lie directly over the predetermined parts or portions 14B of the printing ink composition 14 containing the urethane polymerization catalyst. During such heating procedure, such urethane polymerization catalyst has apparently migrated from the printing ink composition areas 14B to polymerize the areas 18B of the urethane top coating composition 18 to a hardened, cured high glossy condition. However, the other parts or portions 18A of the urethane top coating composition 18 which do not lie directly over any catalyst-containing area are substantially uncured and remain tacky and fluid or semi-fluid and remain in a very soft state, as contrasted to the parts or portions 18B of the urethane top coating composition 18 which are cured and polymerized to a firm, hardened, glossy or shiny condition which is substantially tack-free.

THE PARTICULATE, POWDERED OR GRANULATED DRY BLEND

A particulate, powdered or granulated dry blend 20 of a suitable resinous material, such as a vinyl chloride polymer or co-polymer, or a granulated vinyl compound, or other suitable fine, powdered material, such as talc, mica, silica, etc., of a water insoluble, inert nature, which may be colored or clear, but which contains from about ¼% to about 20% by weight, based on the total weight of the particulate, powdered or granulated material 20, of a urethane polymerization catalyst, such as dibutyl tin dilaurate or any of the previously mentioned urethane polymerization catalysts, is then dusted or otherwise applied substantially uniformly to the entire surface of the urethane top coating composition 18 to form a substantially uniform layer thereon.

The thickness of such a layer of particulate, powdered, granulated dry blend material 20 is not very great and is in the range of from about 1½ mils to about 20 mils. Such dry blend 20 contains finely divided particles, substantially 100% of which is capable of passing through a No. 40 size screen sieve (U.S. Standard Sieve Series) having a sieve opening of 0.0165 inch (0.42 mm.).

The particular method of applying the layer of particulate, powdered or granulated dry blend materials 20 to the surface of the urethane top coating composition 18 does not relate to the essence of the present invention and substantially any conventional or standard procedure may be employed.

The dry blend material 20 adheres very well to the surfaces of the urethane top coating composition 18 in those areas 18A which are still in an unpolymerized state and still are relatively soft, fluid or semi-fluid and tacky. Such materials remain there.

However, the dry blend material 20 does not adhere very well to the surfaces of the urethane top coating composition 18 in those areas 18B which are in a polymerized state and are hardened, cured, glossy and relatively tack-free. As a result, the dry blend material 20 which is deposited on the areas 18B may be easily removed by a blowing operation with air under pressure, or by a suction or vaccum means, or by simple brushing of the surface of the urethane top coating composition 18. Such materials are really considered as excess materials insofar as the purposes of the present invention are concerned.

THE SECOND CURING OPERATION

The multi-layered resinous construction with the dry blend 20 still adhered to the relatively soft, fluid or semi-fluid, unpolymerized surfaces 18 is then exposed to elevated temperatures of from about 250° F. to about 425° F. and preferably from about 270° F. to about 420° F. for a period of time of from about 2 minutes to about 10 minutes in an oven or other suitable heating means, whereupon the polymerization reaction between the polyols and the polyisocyanates in the urethane top coating areas 18A is initiated. Apparently, the urethane polymerization catalyst in the dry blend 20 has migrated thereinto and has initiated such a polymerization reaction. This time, however, the portions or the parts 18A, although they harden and cure, do not achieve a high gloss or shiny appearance, due to the presence of the occluded dry blend particles or granules therein. The fine particulate, powdered or granulated materials 20 have apparently softened, melted and have flowed to some extent at such elevated temperatures into the surfaces 18A of the unpolymerized urethane top coating surfaces and have created a roughened, somewhat pebbled surface having a very irregular surface texture, in sharp contrast to the smooth shiny, high gloss surface areas 18B.

It is also to be observed that the smooth, shiny, high gloss surface areas 18B are in substantially perfect registry with the catalyst-containing portions 14B of the printing ink composition and that the roughened, pebbled, dead, dull surface area 18A are in substantially perfect registry with the inhibitor-containing portions 14A of the printing ink composition, as well as with the relatively raised, chemically embossed surface areas and the relatively depressed, chemically embossed surface areas of the resinous wear layer, as well as the urethane top coating.

The resinous urethane top coating composition 20 is substantially completely cured or polymerized in all surface areas, that is, 18A and 18B, as a result of the two curing operations and is thus substantially monomer free.

THE EMBODIMENT OF FIG. II

The embodiment of FIG. II illustrates an application of the basic principles of the present invention in a slightly different manner in order to achieve a slightly different differential gloss effect, on a slightly different final product.

In FIG. II, corresponding structural elements and constituents have been given the same reference numbers as their counterparts of FIG. I with the sole difference being the addition of a superscript (') in order to clearly identify the relationship between the various products. In FIG. II, a potentially foamable (or non-foamable) base resinous polymer composition 12' is applied or formed as a substantially uniform layer on the surface of a typical fibrous backing sheet material 10'. The gelling operation to firm the surface of the applied base resinous polymer composition 12' is identical to that previously described with reference to FIG. I.

A printing ink composition 14' is then applied to the surface of the gelled, firmed potentially formable base resinous polymer composition 12' but, in this embodiment, both a blowing or foaming inhibitor and a urethane polymerization catalyst are included in the same parts or portions 14A' of the printing ink composition 14', whereas the parts or portions 14B' contain neither the blowing or foaming inhibitor nor the urethane polymerization catalyst.

In some instances, again, as required or desired by existing conditions and circumstances, a relatively small amount or low concentration of the urethane polymerization catalyst may also be included in the parts or portions 14B' in order to modify, adjust, or control the degree of tack of the superjacent portions lying directly thereover, such as in the surfaces of the urethane top coating composition 18B', to be described hereinafter.

The printed, gelled potentially foamable base resinous polymer composition 12' is then allowed to dry and a resinous wear layer plastisol composition 16' is substantially uniformly applied or formed thereon in the same fashion as previously described with reference to FIG. 1. Gelling of the applied resinous wear layer plastisol composition 16' to firm its surface takes place as previously described. Blowing or foaming and fusion may take place simultaneously or successively with the gelling operation.

It is to be noted that, as a result of the blowing or foaming and fusion procedure, the areas of the resinous wear layer 16' which lie directly over the portions of the printing ink composition 14' containing both the blowing or foaming inhibitor and the urethane polymerization catalyst, that is, portions 14A', are in a normal unembossed, relatively lower condition, whereas the other portions of the resinous wear layer 14' which do not lie over the portions 14A' are in a raised or expanded, relatively higher condition. Such expansion or chemical embossing is essentially opposite to that described for FIG. I and illustrated therein.

In such an application of the principles of the present invention, care should be taken to insure the complete compatibility of the blowing of foaming inhibitor and the urethane polymerization catalyst which are both in the portion 14A' of the printing ink composition 14' so that there is no appreciable or significant reaction or interaction between the two components of that particular printing ink composition.

A urethane top coating composition 18' is then applied or formed substantially uniformly on the surface of the blown or foamed and fused multi-layered product and contains a substantially uniform mixture of unreacted polyols and unreacted polyisocyanates, additives such as surfactants and other agents, but again there is no inclusion of any urethane polymerization catalysts. The polyols and polyisocyanates are as previously described herein. The thickness of the applied layer of urethane top coating composition 18' is again in the range of from about 0.005 inch to about 0.015 inch, although greater or lesser thickness may be employed for special conditions and circumstances.

The curing of certain surface portions 18A' of the applied urethane top coating composition 18' proceeds at an elevated temperature under the previously described blowing or foaming and fusion temperatures. As a result, the surface portions 18A' of the applied urethane top coating composition 18' are polymerized and cured to a hardened, shiny and glossy condition, whereas the surface portions 18B' which do not lie directly over a urethane polymerization catalyst portion 14A' remain relatively soft, fluid or semi-fluid, unpolymerized and uncured.

A particulate, powdered or granulated dry blend 20' of a suitable material, preferably a resinous polymer material such as a vinyl chloride polymer or copolymer, or a granulated vinyl compound, or another suitable finely divided material such as talc, mica, silica, etc., of a water-insoluble, inert nature, which may be colored, tinted or clear, but which contains a urethane polymerization catalyst in the amounts and concentrations mentioned previously in connection with the embodiment of FIG. I is then dusted on or otherwise applied to the entire surface of the urethane top coating composition 18' to form a substantially uniform layer thereon. The particle size of the particulate, powdered or granular dry blend material 20' is as described previously.

The applied dry blend 20' does not adhere very well to the cured tack-free surfaces 18A' of the urethane top coating composition 18' and is easily removed therefrom by air blowing from jets or the like, or by suction or vacuumatic means, or by simple brushing. However, the applied dry blend 20' does adhere very well to the unpolymerized, uncured, fluid or semi-fluid, tacky surfaces 18B' and is not removed by the air jets, or the vacuum or suction means or the simple brushing. Such multi-layered product is then exposed to the elevated temperatures of the second curing operation, as described previously, whereby the portions 18B' of the urethane top coating composition 18' are also cured or polymerized.

As a result, the resinous urethane top coating composition 18' is substantially completely cured or polymerized in all surface areas 18A' and 18B' and is substantially completely monomer free. Such result is generally comparable to the results obtained in the embodiment of FIG. I, although in sort of a reverse fashion.

The raised, chemically embossed surface areas 18B' are dead and dull, have a pebbly, roughened appearance and a relatively low gloss effect. The relatively lower, chemically unembossed surface areas 18A' are shiny and glossy and create an excellent contrast to the dead and dull areas 18B'. It is also to be observed that there is substantially perfect registry with the corresponding portions 14A' and 14B' of the pattern or design of the printing ink composition 14'.

Consideration of the Figures indicates that there are four possible major basic variations of the differential gloss effects products of the present invention, as follows:

(1) When the particular printing ink composition applied to a particular part or portion of the surface of the base resinous polymer composition contains both a blowing or foaming inhibitor and a urethane polymerization catalyst, such as noted in areas 14A' of FIG. II, the corresponding portion of the surface of the urethane top coating composition lying directly thereover will have a normal chemically unembossed height and will have a shiny, smooth, high gloss surface, such as noted in areas 18A'.

(2) When the particular printing ink composition applied to a particular part or portion of the surface of the base resinous polymer composition contains only a blowing or foaming inhibitor and no urethane polymerization catalyst, such as noted in areas 14A of FIG. I, the corresponding portion of the surface of the urethane top coating composition lying directly thereover will have a normal chemically unembossed height and will have a dull, dead, low gloss surface, such as noted in areas 18A.

(3) When the particular printing ink composition applied to a particular part or portion of the surface of the base resinous polymer composition contains only a urethane polymerization catalyst and no blowing or foaming inhibitor, such as noted in areas 14B of FIG. I, the corresponding portion of the surface of urethane top coating composition lying directly thereover will have a raised or expanded chemically embossed height and will have a smooth, shiny, high gloss effect, such as noted in areas 18B.

(4) When the particular printing ink composition applied to a particular part or portion of the surface of the base resinous polymer composition contains neither a blowing or foaming inhibitor nor a ureyhane polymerization catalyst, such as noted in areas 14B' in FIG. II, the corresponding portions of the surface of the urethane top coating composition lying directly thereover will have a raised or expanded chemically embossed height and will have a dead, dull, low gloss effect, such as noted in areas 18B'.

It is therefore to be appreciated that all four types of surface areas of the urethane top coating composition are possible in any one particular product, depending upon the particular predetermined pattern or design of the printing ink composition selected, thereby providing excellent choices of the four above-described surfaces.

The present invention will be described further with particular respect to the following specific examples, wherein there are shown preferred and typical embodiments of the present invention. However, such specific examples are primarily illustrative of the general principles of the present invention and the specific materials, chemical compounds, patterns or designs and other particular aspects of the invention should not be construed as limitative of the broader scope of the inventive concept, except as defined by the scope and the spirit of the appended claims.

EXAMPLE I

A resinous polymer sheet material, such as illustrated in FIG. I of the drawings, is made as follows:

The backing sheet material comprises a relatively flat, 0.030 inch thick fibrous sheet of felted asbestos fibers with an acrylic smoothing or leveling coating thereon.

The asbestos fibrous backing sheet material is coated substantially uniformly to a wet thickness of about 0.012 inch with the following potentially foamable base resinous polymer composition:

|  | Parts |
|---|---|
| Polyvinyl chloride, med. mol. wt., general purpose dispersion resin, inh. vis. 0.99 (ASTM D-1243-66) | 30.2 |
| Polyvinyl chloride, med. mol. wt., dispersion grade resin, inherent viscosity 1.0 | 8.2 |
| Polyvinyl chloride, med. mol. wt., blending resin, inherent viscosity 0.9 | 17.1 |
| Anhydrous alumina silicate filler | 6.9 |
| Butyl benzyl phthalate plasticizer | 15.4 |
| Alkyl benzyl phthalate low boiling point plasticizer | 9.3 |
| Polydodecyl benzene | 7.4 |
| Azodicarbonamide blowing or foaming agent | 1.1 |
| Accelerator/stabilizer | 0.4 |
| Titanium dioxide | 2.5 |
| Dioctyl phthalate | 1.5 |
| Wetting agent | 0.03 |

Gelling and firming of the potentially foamable base resinous polymer composition is accomplished in an oven atmosphere maintained at an elevated temperature of about 300° F. for a time of about 3 minutes. This temperature is not sufficiently high as to activate or decompose the blowing or foaming agent.

The gelled and firmed, potentially foamable base resinous polymer composition is then printed with a ceramic tile brick pattern or design as shown in FIG. 1, as follows:

Areas 14A are printed with the following ink composition:

|  | Parts |
|---|---|
| Solution grade co-polymer of vinyl chloride (90 parts) and vinyl acetate (10 parts) | 13 |
| Methyl ethyl ketone | 67 |
| Trimellitic anhydride blowing or foaming inhibitor | 20 |

-continued

|  | Parts |
|---|---|
| Urethane polymerization catalyst | 0 |
| Coloring pigment or agent, as required or desired | |

Areas 14B are printed with the following ink composition:

|  | Parts |
|---|---|
| Solution grade co-polymer of vinyl chloride (90 Parts) and vinyl acetate (10 Parts) | 14 |
| Methyl ethyl ketone | 81 |
| Blowing or foaming inhibitor | 0 |
| Dibutyl tin dilaurate urethane polymerization catalyst | 5 |
| Coloring pigment or agent, as required or desired | |

The printed, gelled, potentially foamable base resinous polymer composition is then allowed to dry and a resinous wear layer composition is applied thereto to a wet thickness of about 0.010 inch and having the following composition:

|  | Parts |
|---|---|
| Polyvinyl chloride, dispersion grade, inh. vis. 0.8 | 100 |
| Butyl benzyl phthalate plasticizer | 28 |
| 2,4,4-trimethyl pentyl-3,5-diisobutyrate | 23 |
| Alkyl benzyl phthalate | 4 |
| Ba-Zn phosphite heat stabilizer | 6 |

Gelling or firming, blowing or foaming, and fusion of the resins take place by heating in an oven atmosphere at an elevated temperature of about 430° F. for a period of about 1 minute and 40 seconds.

The blown or foamed, fused, chemically embossed, resinous, polymer sheet material is then coated with a urethane top coating composition to a substantially uniform thickness of about 1½ mils and having the following formulation:

|  | Parts |
|---|---|
| Methylene-bis (cyclohexylisocyanate), 31.8% minimum NCO- content | 85.8 |
| Polytetramethylene ether glycol, hydroxyl number 174, molecular weight 650 | 9.8 |
| Polyoxy alkylene polyether tetrol, hydroxyl number 374, molecular weight 600 | 69.0 |
| Reactive silicone wetting agent, hydroxyl number 47, molecular weight 2400 | 0.12 |

Polymerization or curing of the applied urethane top coating composition takes place in an oven atmosphere having an elevated temperature of about 325° F. for about 5 minutes. The relatively lower mortar or grout areas 18A lying directly over the inhibitor containing areas 14A of the printing ink composition are uncured and are soft, fluid or semi-fluid. The relatively higher land areas 18B lying directly over the catalyst-containing areas 14B of the printing ink composition are cured, hardened or firmed and have a smooth, shiny, high gloss.

A particulate, powdered or granulated dry blend is then dusted over the entire surface of the urethane top coating composition to a depth of about 20 mils. The dry blend has the following formulation:

|  | Parts |
|---|---|
| Vinyl chloride (90 parts) and vinyl acetate (10 parts) specific viscosity 0.28 | 100 |
| Dioctyl phthalate | 30 |
| Stabilizer | 3 |
| Dibutyl tin dilaurate | 5 |

Dry blend passes through No. 40 size sieve opening 0.0165 inch.

The particulate, powdered or granulated dry blend adheres very well to the mortar areas 18A which are uncured, soft, fluid or semi-fluid. However, the dry blend does not adhere very well to the land areas and is easily removed by a gentle brushing.

Passage through an oven atmosphere at an elevated temperature of about 325° F. for 3 minutes cures the urethane top coating composition in these areas 18A which now become hardened and firmed but which do not acquire a shiny or glossy appearance due to the inclusion therein of the dry blend materials which melt or flow to some extent and produce a roughened or pebbled appearance having a low gloss effect.

The differential gloss effect of the contrast of the raised, chemically embossed, shiny, high gloss areas 18B with the normal height, chemically unembossed, dull, dead, low gloss areas 18A is unusual and most interesting. Substantially perfect registry is noted between the areas 18A of the urethane top coating composition and the printed areas of the ink composition, as well as with the substantially perfect registry of the areas 18B of the urethane top coating composition with the printed areas 14B of the ink composition, with all areas in perfect registry with the chemically embossed relatively higher and lower portions. A very realistic mortar or grout appearance in the relatively lower, normal height areas, as contrasted with the very realistic land appearance of the relatively higher, chemically embossed areas. Substantially all the monomeric materials originally in the top coating composition are polymerized or cured. There is substantially no free monomer in the final top coating. The resinous polymer sheet material product finds excellent use as a resilient floor covering. In such use, the facts that the polyurethane top coating is polymerized and/or cross-linked in all portions, is thermoset and possesses relatively higher melt viscosities is highly advantageous, in that such surfaces are more resistant to changes under future conditions.

EXAMPLE II

The procedures described in Example I are followed substantially as set forth therein, with the exception that the printing ink compositions are changed, in order to prepare the resinous polymer sheet material product illustrated in FIG. II.

The printing ink composition which is applied to areas 14A' contains both a blowing or foaming inhibitor, as well as a urethane polymerization catalyst, as follows:

|  | Parts |
|---|---|
| Solution grade co-polymer of vinyl chloride (90 Parts) and vinyl acetate (10 parts) | 10 |
| Methyl ethyl ketone | 55 |
| Trimellitic anhydride | 20 |
| Dubutyl tin dilaurate | 15 |

-continued

| | Parts |
|---|---|
| Pigment or colorant, as required or desired | |

The printing ink composition which is applied to areas 14B' contains neither a blowing or foaming agent nor a urethane polymerization catalyst, as follows:

| | Parts |
|---|---|
| Solution grade co-polymer of vinyl chloride (90 parts) and vinyl acetate (10 parts) | 15 |
| methyl ethyl ketone | 85 |
| Pigment or colorant, as required or desired | |

The differential gloss effect of the contrast of the normal height, chemically unembossed, shiny, high gloss areas 18A' with the relatively higher, chemically embossed, dull, dead, low gloss areas 18B' is unusual and most interesting. Substantially perfect registry is noted between the areas 18A' of the urethane top coating with the areas 14A' of the printing ink composition. And, substantially perfect registry is noted between the areas 18B' of the urethane top coating composition with the areas 14B' of the printing ink composition. The results of this Example are generally comparable to the results obtained in Example I, as more specifically described in greater detail therein.

EXAMPLE III

The procedures described in Example I are followed substantially as set forth therein, with the exception that the methylene-bis(cyclohexylisocyanate) is replaced by isophorone diisocyanate (3-isocyanatomethyl-3,5,5-trimethylcyclohexyl-isocyanate. The results of this Example are generally comparable to the results obtained in Example I.

EXAMPLE IV

The procedures described in Example I are followed substantially as set forth therein, with the exception that the methylene-bis(cyclohexylisocyanate) is replaced by 2,4,4-trimethyl-hexamethylene diisocyanate. The results of this Example are generally comparable to the results of Example I.

EXAMPLE V

The procedures described in Example I are followed substantially as set forth therein, with the exception that the ink composition used to print areas 14B has the following composition:

| | Parts |
|---|---|
| Solution grade co-polymer of vinyl chloride (90 parts) and vinyl acetate (10 parts) | 13.5 |
| Methyl ethyl ketone | 79.5 |
| Dibutyl tin dilaurate | 7 |
| Pigment or colorant, as required or desired | |

The results of this Example are generally comparable to the results of the procedures of Example I, as more specifically described therein. The urethane top coating composition of the final resinous polymer sheet material is substantially cured or polymerized in all portions thereof and is substantially monomer free in all portions. All portions are thermoset and have relatively high melt viscosities.

EXAMPLES VI and VII

The procedures described in Example I are followed substantially as set forth therein, with the exception that the amount of the dibutyl tin dilaurate in the particulate, powdered or granulated dry blend is changed to: 2 parts (Example VI) and 8 parts (Example VII). The results of these Examples are generally comparable to the results set forth in Example I, as more specifically described in greater detail therein.

EXAMPLE VIII

The procedures described in Example I are followed substantially as set forth therein, with the exception that the thickness or depth of the particulate, powdered, or granulated dry blend that is applied to the surface of the urethane top coating composition is about 17 mils. The results of this Example are generally comparable to the results of Example I, as more specifically described in greater detail therein. All surface portions are polymerized and/or cross-linked, are thermoset, monomer-free and have relatively high melt viscosities.

Although the present invention has been described in great particularity in the preceding specific Example wherein there are set forth preferred and typical embodiments of the present invention, such is not to be construed as limitative of the broader aspects of the inventive concept but only illustrative thereof. The specific materials, chemical compounds, patterns, designs, and other particular aspects of these Examples are simply illustrative and do not limit the broader scope of invention which is limited and defined by the scope and the spirit of the appended claims.

What is claimed is:

1. A differential gloss resinous sheet material comprising:
   a base resinous material, portions of which are blown or foamed and portions of which are unblown or unfoamed;
   a printing ink composition on said base resinous material in the form of a predetermined pattern or design, some printed portions of which contain a urethane polymerization catalyst and some printed portions of which contain a blowing or foaming inhibitor, said urethane polymerization catalyst-containing portions and said blowing or foaming inhibitor-containing portions occupying the same or different portions;
   a resinous wear layer applied to said printing ink composition and having relatively higher areas and relatively lower areas;
   a substantially monomer-free polyurethane top coating, substantially all parts of which are substantially completely polymerized, applied to said resinous wear layer and having relatively higher surfaces and relatively lower surfaces, some of said surfaces having a smooth, shiny, high gloss appearance and some of said surfaces having a dead, dull, low gloss appearance; and
   a particulate, powdered or granulated material adheringly embedded in said surfaces having a dead, dull, low gloss appearance.

2. A differential gloss resinous sheet material as defined in claim 1, wherein said relatively higher surfaces have a smooth, shiny, high gloss appearance.

3. A differential gloss resinous sheet material as defined in claim 1, wherein said relatively higher surfaces have a dead, dull, low gloss appearance.

4. A differential gloss resinous sheet material as defined in claim 1, wherein said relatively lower surfaces have a smooth, shiny, high gloss appearance.

5. A differential gloss resinous sheet material as defined in claim 1, wherein said relatively lower surfaces have a dead, dull, low gloss appearance.

6. A differential gloss resinous sheet material as defined in claim 1, wherein said particulate, powdered or granulated material has a particle size less than about 0.0165 inch.

7. A differential gloss resinous sheet material as defined in claim 1, wherein said particulate, powdered or granulated material is a resinous material.

8. A differential gloss resinous sheet material as defined in claim 1, wherein said particulate, powdered or granulated material is water-insoluble and relatively chemically inert.

9. A method of making a differential gloss resinous sheet material which comprises:

forming a gelled, potentially foamable, base resinous material containing a blowing or foaming agent;

applying to said gelled, base resinous material a printing ink composition in a predetermined pattern or design, some printed portions containing urethane polymerization catalysts and some printed portions containing blowing or foaming inhibitors, said urethane polymerization catalyst-containing printed portions and said blowing or foaming inhibitor-containing printed portions occupying the same or different printed portions;

applying substantially uniformly to said printed, gelled, base resinous material a substantially uniform resinous wear layer;

applying heat to said base resinous material and said resinous wear layer to gel and fuse said resinous wear layer and to blow or foam and fuse said base resinous material;

applying a substantially uniform urethane top coating composition comprising unreacted polyols and unreacted polyisocyanates substantially uniformly to said resinous wear layer;

applying heat to said base resinous material, said resinous wear layer and said urethane top coating composition to polymerize the unreacted polyols and unreacted polyisocyanates only in those surface portions of the urethane top coating composition lying directly over said urethane polymerization catalyst-containing printed portions of said printing ink composition, whereby such surface portions become relatively hardened whereas the other surface portions of said urethane top coating composition remain relatively soft and tacky and substantially unpolymerized;

applying a particulate, powdered or granular dry blend material containing a urethane polymerization catalyst substantially uniformly to the entire surface of said urethane top coating composition;

removing said particulate, powdered or granular dry blend material from those surface portions of said urethane top coating composition which are polymerized and are hardened, smooth, shiny and glossy and permitting said particulate, powdered, or granular dry blend material to remain on the unpolymerized surface portions of said urethane top coating composition; and applying heat to said urethane top coating composition and said particulate, powdered or granular dry blend material, whereby said unpolymerized surface portions of said urethane top coating composition become polymerized but form dead, dull, low gloss surface portions due to the particulate, powdered or granular material embedded therein.

10. A method of making a differential gloss resinous sheet material as defined in claim 9 which comprises using a particulate, powdered or granulated dry blend material which has a particle size less than about 0.0165 inch.

11. A method of making a differential gloss resinous sheet material as defined in claim 9 which comprises using a particulate, powdered or granulated material which is resinous.

12. A method of making a differential gloss resinous sheet material as defined in claim 9 which comprises using a particulate, powdered or granulated material which is water-insoluble and relatively chemically inert.

13. A method of making a differential gloss resinous sheet material as defined in claim 9 which comprises removing said particulate, powdered or granular dry blend material from said polymerized, hardened, smooth, shiny and glossy surface portions by a brushing operation.

14. A method of making a differential gloss resinous sheet material as defined in claim 9, wherein said urethane polymerization catalyst and said blowing or foaming inhibitor are included in the same portions of said printing ink composition.

15. A method of making a differential gloss resinous sheet material as defined in claim 9, wherein said urethane polymerization catalyst and said blowing or foaming inhibitor are included in different portions of said printing ink composition.

16. A method of making a differential gloss resinous sheet material as defined in claim 9, wherein substantially all the portions of said urethane top coating composition is polymerized and is substantially monomer-free.

* * * * *